(12) United States Patent  
Sugawara

(10) Patent No.: US 9,300,788 B2  
(45) Date of Patent: Mar. 29, 2016

(54) APPARATUS AND CONTROL METHOD FOR THE SAME

(71) Applicant: CANON KABUSHIKI KAISHA, Tokyo (JP)

(72) Inventor: Naoki Sugawara, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/139,585

(22) Filed: Dec. 23, 2013

(65) Prior Publication Data

US 2014/0185791 A1 Jul. 3, 2014

(30) Foreign Application Priority Data

Dec. 27, 2012 (JP) ................................. 2012-285805

(51) Int. Cl.
*H04M 9/00* (2006.01)
*H04M 1/76* (2006.01)
*H04M 11/06* (2006.01)

(52) U.S. Cl.
CPC .............. *H04M 1/76* (2013.01); *H04M 11/066* (2013.01)

(58) Field of Classification Search
CPC ..... H04M 1/745; H04M 3/2209; H04M 3/30; H04M 19/02; H04M 3/08; H04M 3/304; H04M 11/06; H04M 19/001; H04M 3/005; H04M 19/04; H04M 11/062; H04M 19/005; H04M 3/007; H04M 3/02; H04M 3/2272; H04M 1/24; H04M 1/738; H04M 11/066; H04M 1/2475; H04M 1/312; H04M 1/654; H04M 1/723; H04M 1/76; H04M 3/04; H04M 7/0096; H04M 9/006; H04L 12/10
USPC ......... 379/399.01, 93.05, 377, 382, 412, 394, 379/373.01, 413.01, 252, 29.04, 398, 413, 379/90.01, 93.29, 3, 87.01, 418, 30, 395.01, 379/416, 402, 403, 406.16, 34, 82, 379/106.05–106.09, 415
See application file for complete search history.

(56) References Cited

U.S. PATENT DOCUMENTS

| | | | | |
|---|---|---|---|---|
| 4,039,763 A * | 8/1977 | Angner | ................ | H04M 9/006 379/30 |
| 4,567,329 A * | 1/1986 | Bailly | ................ | H04M 7/0096 379/364 |
| 4,620,063 A * | 10/1986 | Todd | .................... | H04M 1/654 379/382 |
| 4,737,981 A * | 4/1988 | Hoberman | ............ | H04M 1/723 379/111 |
| 5,920,624 A * | 7/1999 | Davis | ........................ | 379/373.01 |
| 6,178,241 B1 * | 1/2001 | Zhou | ........................... | 379/382 |
| 6,473,507 B1 * | 10/2002 | Eckert | ..................... | H04M 1/74 379/399.01 |
| 6,522,730 B1 * | 2/2003 | Timm et al. | ............... | 379/93.08 |
| 6,522,745 B1 * | 2/2003 | Tuttle | ................. | H04L 25/0266 379/399.01 |
| 6,556,673 B1 * | 4/2003 | Davis | ........................... | 379/377 |

(Continued)

*Primary Examiner* — Akelaw Teshale

(74) *Attorney, Agent, or Firm* — Canon U.S.A., Inc. IP Division

(57) ABSTRACT

An apparatus which accepts a connection of an external telephone and connects to a telephone line includes a first controller configured to control line impedance via the telephone line, a detecting unit configured to detect a ringing signal received from the telephone line, a determining unit configured to determine whether the external telephone captures a telephone line, and a second controller configured to invalidate the control over line impedance by the first controller in a case where the apparatus is a standby state and validate the suppression of the control over ringer impedance by the first controller in a case where the detecting unit detects the ringing signal and the determining unit determines that the external telephone does not capture a telephone line.

15 Claims, 3 Drawing Sheets

(56) References Cited

U.S. PATENT DOCUMENTS

| | | | |
|---|---|---|---|
| 6,590,973 B1* | 7/2003 | Bijman et al. | 379/377 |
| 6,654,461 B1* | 11/2003 | Poulis | H04M 3/04 379/377 |
| 7,023,985 B1* | 4/2006 | Hauptmann | H04M 1/76 379/373.01 |
| 2010/0315121 A1* | 12/2010 | Atrash | H03K 19/0005 326/30 |

* cited by examiner ered and stored in the RAM 103. The communication
APPARATUS AND CONTROL METHOD FOR THE SAME

BACKGROUND OF THE INVENTION

1. Field of the Invention

The present invention relates to apparatuses and methods for controlling line impedance of a telephone line.

2. Description of the Related Art

Conventionally, line standards for communication apparatuses are provided for each country, and communication apparatuses must be compliant with the line standards of each country. The ringer impedance standard that is one of such line standards provides an upper limit to a ringer impedance value in some countries such as Republic of South Africa. In those countries, elements having different impedance values from each other have been used through a network control unit (NCU) for compliance with the standards of the countries. This may prevent commonality of circuit substrates of communication apparatuses and may therefore increase their costs. In a communication apparatus disclosed in U.S. Pat. No. 6,522,745, a data access arrangement (DAA) is used instead of such an NCU, and the data access arrangement controls a line current value to allow the ringer impedance value to be compliant with the corresponding standard.

However, according to U.S. Pat. No. 6,522,745, a transition of line voltage may occur when a telephone line having a high inductor (L) component is inserted to a communication apparatus or a telephone connected to a communication apparatus is OFF-hooked or ON-hooked. This may cause a problem that the control over ringer impedance by a data access arrangement may oscillate line voltage.

Similarly, when pulse dialing is performed from a telephone connected to a communication apparatus, a transition of line voltage occurs, which may oscillate line voltage. Such oscillation of line voltage may possibly have an adverse effect on a line facility such as exchange.

SUMMARY OF THE INVENTION

According to the present invention, there is provided an apparatus which accepts a connection of an external telephone and connects to a telephone line, the apparatus including a first controller configured to control line impedance of the telephone line, a detecting unit configured to detect a ringing signal received from the telephone line, a determining unit configured to determine whether the external telephone captures a telephone line, and a second controller configured to suppress the control over line impedance by the first controller in a case where the apparatus is a standby state and cancel the suppression of the control over line impedance by the first controller in a case where the detecting unit detects the ringing signal and the determining unit determines that the external telephone does not capture a telephone line.

Further features of the present invention will become apparent from the following description of exemplary embodiments with reference to the attached drawings.

DESCRIPTION OF THE EMBODIMENTS

Figure 1:
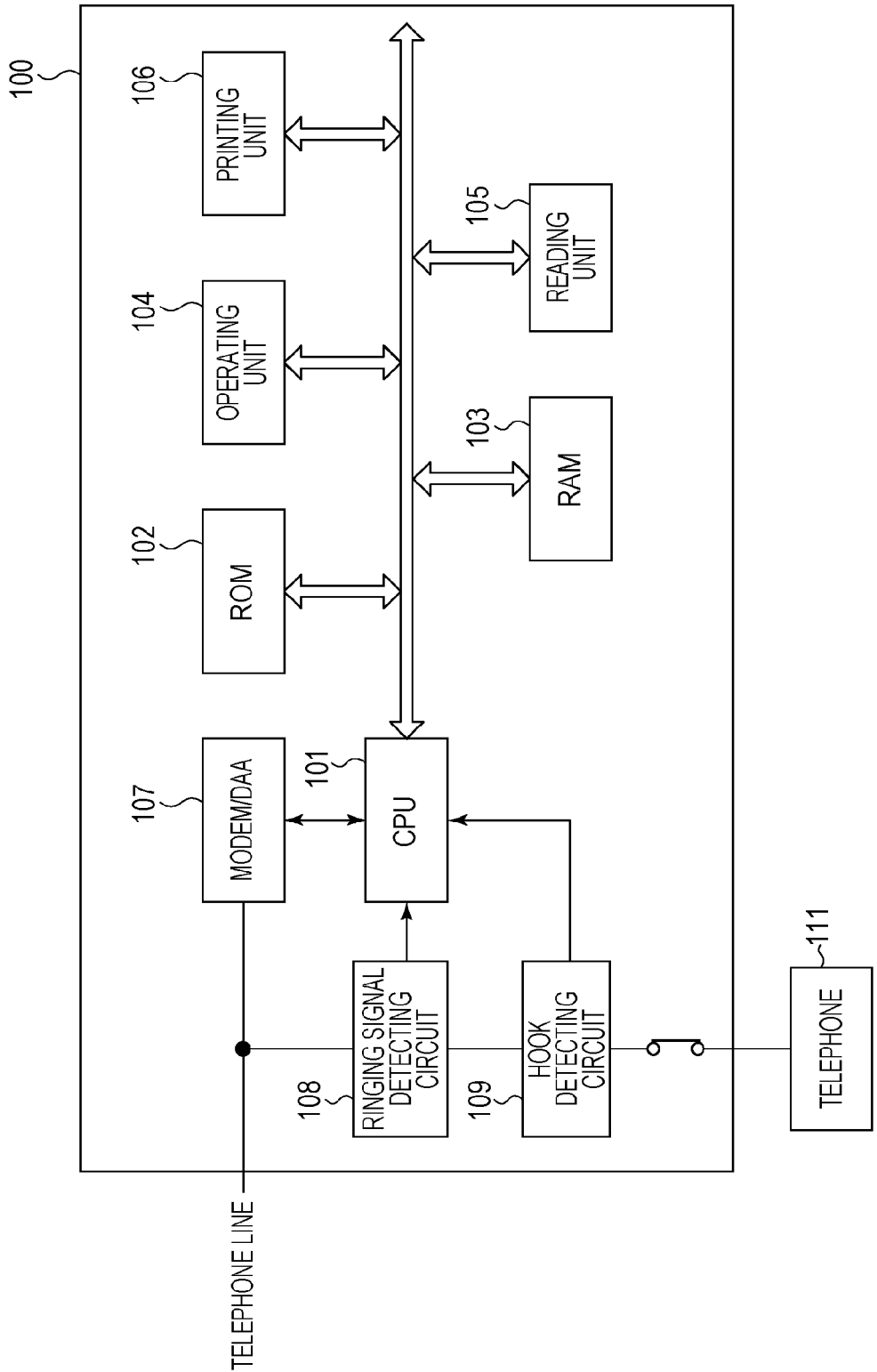
FIG. 1 is a block diagram illustrating a configuration of a communication apparatus according to the present invention.

FIG. 1 is a block diagram illustrating a configuration of a communication apparatus according to an embodiment of the present invention. A CPU 101 controls a communication apparatus 100. A ROM 102 may store a program and table data, for example. A RAM 103 may store buffer data and stack data required for an operation. The CPU 101 controls over the communication apparatus by using a part of the RAM 103 as a work area on basis of a control program for facsimile communication, display, recording and so on stored in the ROM 102. The CPU 101 has a serial interface (I/F) and operates as a host of a modem/DAA 107.

An operating unit 104 may include a key to be operated by a user, such as a numeric keypad, a cursor key, a start key, and a stop key, an LCD configured to display a message, and a speaker configured to emit a key touch tone, for example. A user may be allowed to use a numeric keypad to call an arbitrary party, use a cursor key or a start key to select a menu item, and instruct an operation such as a facsimile transmission. A reading unit 105 reads a document for copying or facsimile transmission and stores read data in the RAM 103. Data stored in the RAM 103 may be facsimile transmitted or be transferred to and printed by a printing unit 106 through a communication unit (such as the modem/DAA 107). The printing unit 106 may print image data copied, facsimile-received and stored in the RAM 103. The communication apparatus 100 accepts connection of a telephone 111.

The modem/DAA 107 is connected to a telephone line (public line) and performs network control and image signal demodulation/modulation for facsimile transmission and reception. The modem/DAA 107 is a communication unit having a modem and a data access arrangement (DAA).

The data access arrangement (DAA) is a line control IC configured to communicate with a modem via a modem interface for data exchange. More specifically, the data access arrangement (DAA) allows control of a line current value. Controlling a line current value allows a ringer impedance value to be compliant with a standard. The modem/DAA 107 has a changing unit configured to change ringer impedance. It should be noted that the modem/DAA 107 is connected to a telephone line through a telephone line connection terminal, not illustrated, and line DC voltage and AC voltage such as a ringing signal are supplied from an exchange on a telephone line to between two T/R lines of the telephone line. Hereinafter, a term "ringer impedance control" refers to a matter that the modem/DAA 107 controls a line current value to allow an impedance value between the two lines of a telephone line to be compliant with a standard.

The modem includes a modem CPU that is different from the CPU 101 and memory such as a ROM and a RAM, not illustrated. Programs stored in the ROM and RAM may be executed by the modem CPU to allow the modem to perform line control, protocol control, and communication data processing required for facsimile communication. The modem is connected to the CPU 101 that is a host via a serial interface, operates on basis of an instruction from the host and responds to the host. The instruction will be called a command. According to this embodiment, the modem/DAA 107 and the CPU 101 are connected via a serial interface and use an AT command for communication between the modem/DAA 107 and the CPU 101. It should be noted that a different interface such as a parallel interface may be used instead of a serial interface.

The modem/DAA 107 is connected to a telephone line and may perform, as a communication apparatus, an operation in connecting to a telephone line, control over direct current, and transmission and reception of an alternating-current signal, for example, under a PTT standard of each country.

A ringing signal detecting circuit 108 is connected to a telephone line in parallel with the modem/DAA 107 and detects a ringing signal coming from the telephone line. It should be noted that the term telephone line may be a public switched telephone network (PSTN) or a private network using a private branch exchange (PBX) as an exchange.

A hook detecting circuit 109 detects whether a telephone connected to the communication apparatus is OFF-hooked (OFF-hook state) or is ON-hooked (ON-hook state). A telephone 110 is a telephone connected to the communication apparatus. According to this embodiment, the hook detecting circuit 109 detects whether the telephone is ON-hooked in accordance with whether a line current value has been detected or not, for example. It should be noted that the hook detection is performed on basis of a line current value, but the hook detection may be performed on basis of line DC voltage. Performing hook detection based on a line current value allows detection with higher accuracy.

The term OFF-hook refers to line capturing by lifting a handset of an external telephone when a telephone (which may also be called an external telephone) connected to a communication apparatus is connected to a telephone line. The term ON-hook refers to line release by putting down a handset. It should be understood that the terms OFF-hook/ON-hook include not only lifting and putting down of a handset but also operations relating to them (such as pressing an ON-hook button and automatic response).

Upon installation, the communication apparatus 100 allows a user to select a country (or communication standard) for (or under) which the communication apparatus is used, and one country may be selected from a country list displayed on an LCD of the operating unit 104 and be defined through a key operation. Parameters for compliance with a line standard such as a minimum ON time, a maximum ON time, a minimum OFF time, and a maximum OFF time of a ringing signal in the country selected by the operation are read from the ROM 102 and are stored in the RAM 103.

First Embodiment

Figure 2:
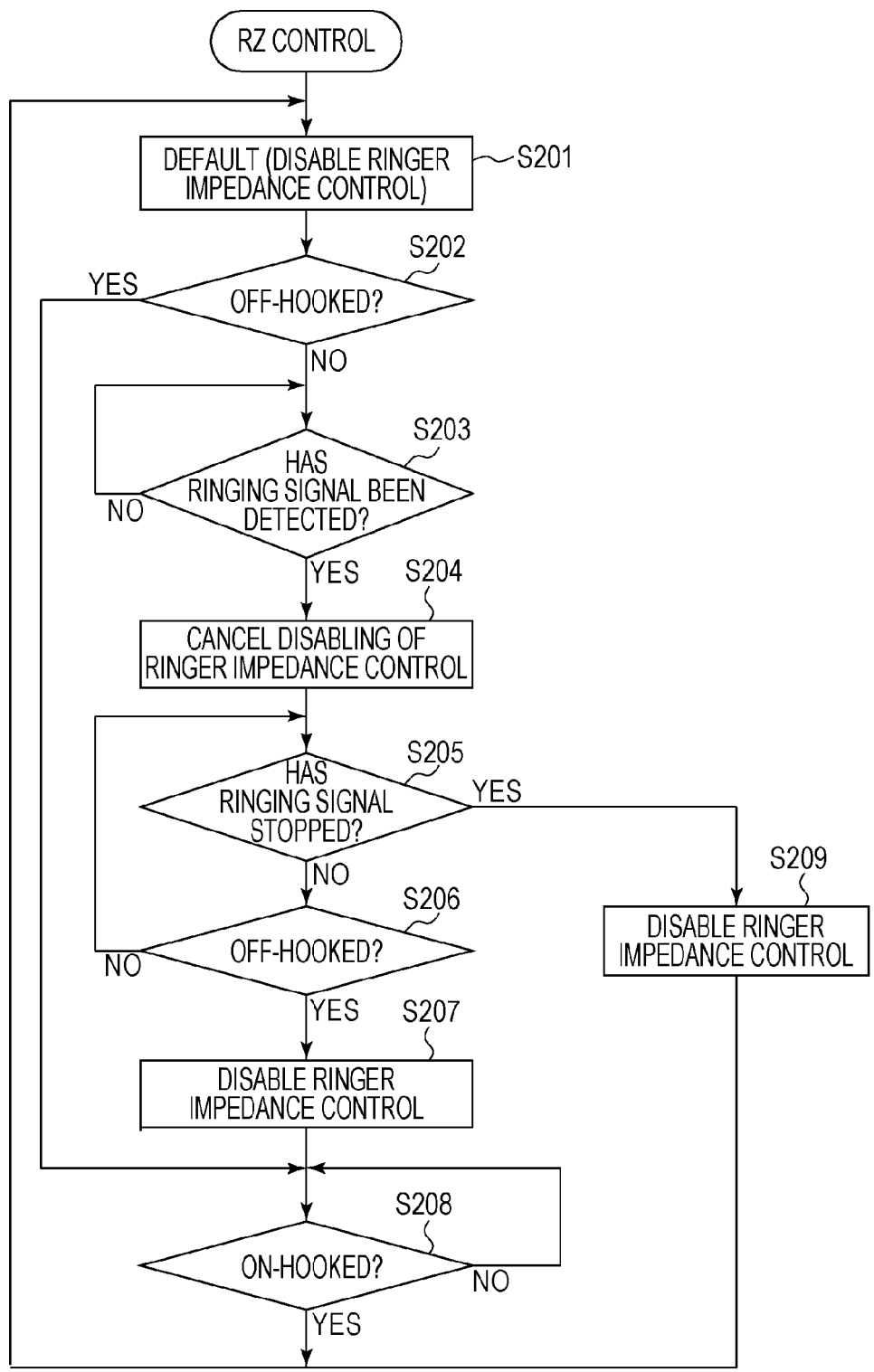
FIG. 2 is a flowchart describing control over line impedance of a telephone line of a communication apparatus according to a first embodiment.

According to a first embodiment, the CPU 101 performs controls including disabling impedance control by the modem/DAA 107 and cancelling such disabling. In other words, the CPU 101 switches between validation and invalidation of control over impedance in the modem/DAA 107 to prevent line voltage from oscillating. More specifically, if a communication apparatus has a standby state, impedance control by the modem/DAA 107 is invalidated. If the communication apparatus receives a ringing signal and has an ON-hook state, the impedance control by the modem/DAA 107 is validated. If the communication apparatus has an OFF-hook state, the impedance control by the modem/DAA 107 is invalidated. This may prevent line voltage from oscillating on basis of ringer impedance control by the modem/DAA 107. FIG. 2 illustrates a control flow of ringer impedance control to be executed by the CPU 101 in a communication apparatus according to the first embodiment.

First, at default, the ringer impedance control by the modem/DAA 107 is disabled (S201). In other words, a function of changing ringer impedance is invalidated. More specifically, an AT command for disabling ringer impedance control is transmitted to the modem/DAA 107. Thus, in the communication apparatus having a standby state, ringer impedance control by the modem/DAA 107 is disabled.

Next, whether the communication apparatus has been OFF-hooked or not is determined (S202). If not, the processing moves to step S203. If so, the processing moves to step S208. For example, if a user of the communication apparatus OFF-hooks the telephone 110 to call, the hook detecting circuit 109 detects the OFF-hook state. If the OFF-hook state is detected, the processing moves to step S208. If the OFF-hook state of the telephone 110 is not detected in step S202, the processing moves to step S203.

In step S203, whether the ringing signal detecting circuit 108 has detected a ringing signal or not is determined (S203). If a ringing signal has been detected, an AT command for canceling the disabling of the ringer impedance control by the modem/DAA 107 is transmitted to the modem/DAA 107 (S204). In other words, the ringer impedance changing function is validated.

After the ringer impedance changing function is validated in step S204, the ringing signal detecting circuit 108 determines whether a ringing signal has been stopped (S205). If the ringing signal detecting circuit 108 no longer detects a ringing signal, it is determined that a ringing signal has been stopped because the caller side has hung up. If the ringing signal detecting circuit 108 does not detect a ringing signal, an AT command for disabling ringer impedance control by the modem/DAA 107 is transmitted to the modem/DAA 107 (S209). This may prevent oscillation of line voltage based on ringer impedance control by the modem/DAA 107 when the external telephone has an OFF-hook state.

In step S205, it is determined that a ringing signal has not been stopped, whether the telephone 110 has been OFF-hooked or not is determined (S206). The handset of the telephone 110 is lifted up to response an incoming call, line current is detected, and it is determined that the telephone has been OFF-hooked. If it is determined that the telephone 110 has been OFF-hooked, an AT command for disabling ringer impedance control by the modem/DAA 107 is transmitted to the modem (S207). This may prevent oscillation of line voltage based on ringer impedance control by the modem/DAA 107 when the external telephone has an OFF-hook state.

In step S208, whether the telephone 110 has been ON-hooked or not is determined. If the telephone 110 has been ON-hooked, the processing returns to step S201. If the telephone 110 has not been ON-hooked, whether the telephone 110 has been ON-hooked or not is determined in step S208.

Thus, oscillation of line voltage may be prevented by switching between enabling/disabling of ringer impedance control on basis of the state of a telephone or the state of a communication apparatus.

Second Embodiment

Figure 3:
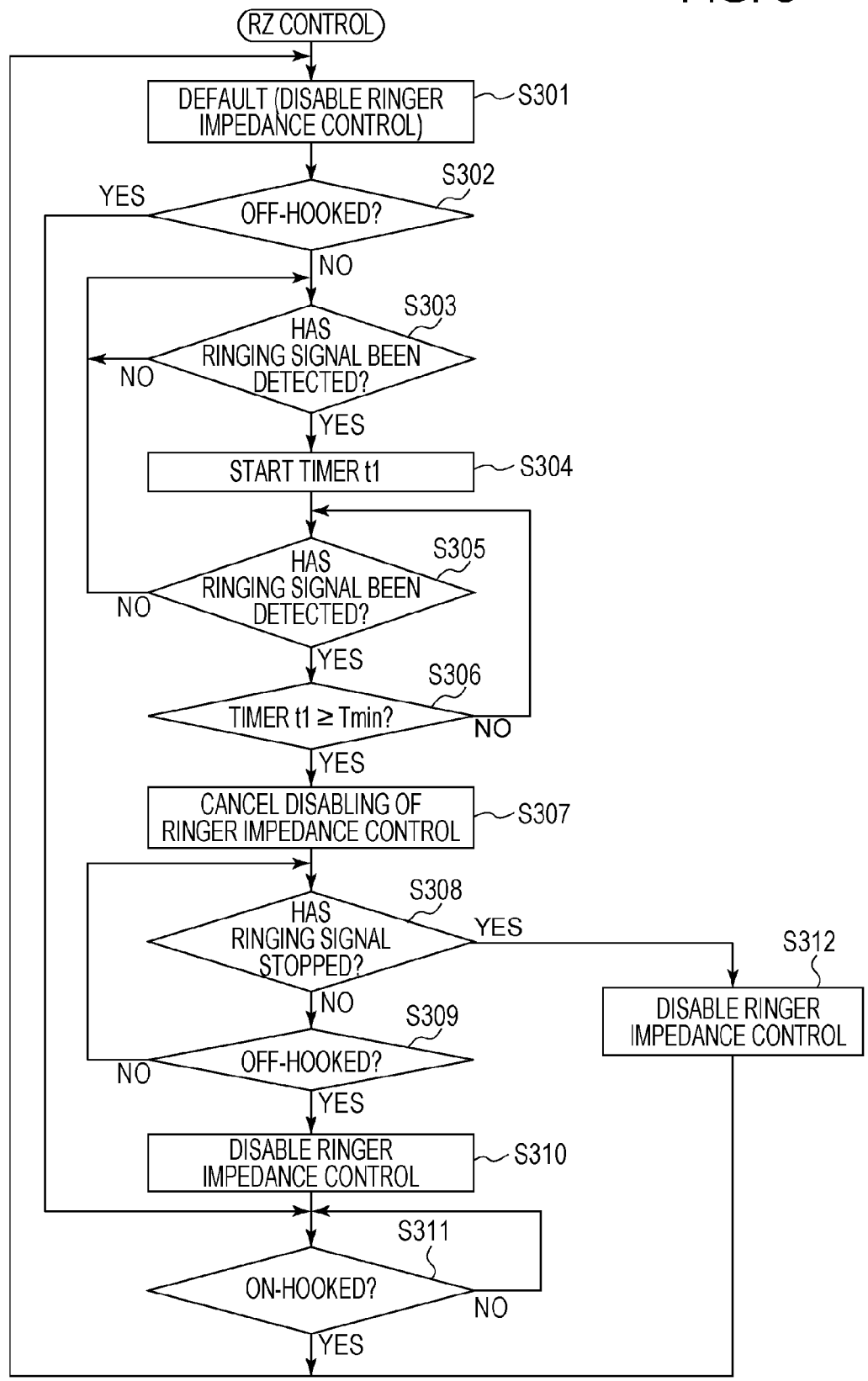
FIG. 3 is a flowchart describing control over line impedance of a telephone line of a communication apparatus according to a second embodiment.

FIG. 3 illustrates a flow of ringer impedance control to be executed by the CPU 101 in a communication apparatus according to a second embodiment. At default, an AT command for disabling ringer impedance control by the modem/DAA 107 is transmitted to the modem/DAA 107 (S301). This may disable ringer impedance control by the modem/DAA 107 when the communication apparatus has a standby state.

Next, whether the communication apparatus has been OFF-hooked is determined (S302). If it is not determined that the communication apparatus has been OFF-hooked, the processing moves to step S303. If it is determined that the communication apparatus has been OFF-hooked, the processing moves to step S311. For example, when a user of the communication apparatus OFF-hooks the telephone 110 to call, the hook detecting circuit 109 detects the OFF-hook state, and the processing moves to step S311. If the OFF-hook state of the telephone 110 is not detected, the ringing signal detecting circuit 108 detects a ringing signal (S303).

If the ringing signal has been detected, a timer t1 is started to measure an ON time of the ringing signal (S304).

Next, the ringing signal detecting circuit 108 determines whether the ringing signal has been detected (S305). If a ringing signal is no longer detected, line noise, for example, may occur rather than a ringing signal, and the processing thus returns to step S303. If it is determined that a ringing signal has been detected, the processing moves to S306.

Whether the value of the timer t1 reaches a minimum ON time (Tmin) or longer of the ringing signal under the standard of the country selected by a user is determined (S306). If the value of the timer t1 is equal to or longer than the minimum ON time (Tmin), an AT command for cancelling the disabling of ringer impedance control by the modem/DAA 107 is transmitted to the modem/DAA 107 (S307). After that, the processing moves to S308. If the value of the timer t1 is shorter than the minimum ON time (Tmin), the processing returns to S305.

After that, whether the ringing signal has been stopped is determined (S308). If the ringing signal detecting circuit 108 no longer detects the ringing signal, it is determined that the caller side has hung up the telephone and the ringing signal has been stopped. If the ringing signal has been stopped, an AT command for disabling ringer impedance control by the modem/DAA 107 is transmitted to the modem/DAA 107 to prevent oscillation of line voltage under the ringer impedance control (S312). This may prevent oscillation of line voltage based on ringer impedance control by the modem/DAA 107 when the external telephone has an OFF-hook state.

If the ringing signal has not been stopped, whether the telephone has been OFF-hooked is determined (S309). If it is determined in step S308 that the ringing signal has not been stopped, whether the telephone 110 has been OFF-hooked or not is determined (S309). The handset of the telephone 110 is lifted up to response an incoming call, line current is detected, and it is determined that the telephone has been OFF-hooked. If it is determined that the telephone 110 has been OFF-hooked, an AT command for disabling ringer impedance control by the modem/DAA 107 is transmitted to the modem (S310). This may prevent oscillation of line voltage based on ringer impedance control by the modem/DAA 107 when the external telephone has an OFF-hook state. If it is determined in step S311 that the telephone 110 has been OFF-hooked, the processing returns to S301. If the telephone 110 has not been OFF-hooked, whether the telephone 110 has been ON-hooked or not is determined in S311.

Thus, oscillation of line voltage may be prevented by switching between enabling/disabling of ringer impedance control on basis of the state of a telephone or the state of a communication apparatus.

According to this embodiment, when a telephone is OFF-hooked/ON-hooked to perform pulse dialing from the telephone, the ringer impedance control may prevent line voltage from oscillating. According to this embodiment, the hook detecting circuit 109 determines capturing of a telephone line of an external telephone. However, an embodiment is not limited thereto, but a hook detecting circuit may be provided within the modem/DAA 107 to determine capturing of a telephone line of an external telephone, for example.

According to this embodiment, switching between invalidating (disabling) and validating (enabling) of impedance control is performed. However, an embodiment is not limited to the switching, but suppression of line voltage from oscillating may only be required. For example, when a communication apparatus has a standby state, impedance control by the modem/DAA 107 may be suppressed. When a communication apparatus receives a ringing signal and has an ON-hook state, the suppression of the impedance control by the modem/DAA 107 may be cancelled.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-285805, filed Dec. 27, 2012, which is hereby incorporated by reference herein in its entirety.

What is claimed is:

1. An apparatus which accepts a connection of a telephone and connects to a telephone line, the apparatus comprising:
   a controller configured to control ringer impedance of the telephone line to be compliant with a standard;
   a detecting unit configured to detect a ringing signal received from the telephone line;
   a determining unit configured to determine whether the telephone captures the telephone line;
   a suppression unit configured to disable the ringer impedance control by the controller until the detecting unit detects the ringing signal; and
   a cancelling unit configured to cancel a disablement of the ringer impedance control,
   wherein the cancelling unit cancels the disablement of the ringer impedance control in a case where the detecting unit detects the ringing signal, and
   wherein the suppression unit disables the ringer impedance control by the controller in a case where the determining unit determines that the telephone captures the telephone line after the detecting unit detects the ringing signal and the cancelling unit cancels the disablement of the ringer impedance control.

2. The apparatus according to claim 1, wherein the suppression unit disables the ringer impedance control by the controller in a case where the detecting unit no longer detects the ringing signal after the detecting unit detects the ringing signal.

3. The apparatus according to claim 1, wherein a data access arrangement (DAA) has the controller.

4. The apparatus according to claim 1, further comprising a second determining unit configured to determine whether an ON time of the ringing signal is equal to or longer than a predetermined time,
wherein the cancelling unit cancels the disablement of the ringer impedance control if the second determining unit determines that the ON time of the ringing signal is equal to or longer than the predetermined time.

5. The apparatus according to claim 4, wherein the predetermined time is a minimum ON time of the ringing signal.

6. The apparatus according to claim 1, wherein the controller is connected to the suppression unit via a serial interface.

7. The apparatus according to claim 1, wherein the suppression unit disables the ringer impedance control by the controller in a case where the apparatus is in a standby state.

8. The apparatus according to claim 1, wherein the suppression unit switches between enabling and disabling of the ringer impedance control by the controller.

9. The apparatus according to claim 1, wherein the controller controls the ringer impedance of the telephone line by controlling a line current value.

10. The apparatus according to claim 1, wherein the suppression unit disables the ringer impedance control by the controller, in a case where the determining unit determines that the telephone does not capture the telephone line after the determining unit determines that the telephone captures the telephone line.

11. A control method for an apparatus which allows a connection of a telephone and connects to a telephone line, the method comprising:
controlling ringer impedance of the telephone line to be compliant with a standard;
detecting a ringing signal received from the telephone line;
determining whether the telephone captures the telephone line;
disabling the ringer impedance control until detecting the ringing signal; and
cancelling a disablement of the ringer impedance control,
wherein the disablement of the ringer impedance control is cancelled in a case where the ringing signal is detected, and
wherein the ringer impedance control is disabled in a case where it is determined that the telephone captures the telephone line after the ringing signal is detected and the disablement of the ringer impedance control is cancelled.

12. The control method according to claim 11, wherein the ringer impedance control of the telephone line is disabled, in a case where the ringing signal is no longer detected after the ringing signal is detected.

13. The control method according to claim 11, wherein the ringer impedance control of the telephone line is disabled in a case where it is determined that the telephone has captured the telephone line.

14. The control method according to claim 11, wherein the ringer impedance control is disabled in a case where the ringing signal is no longer detected after detecting the ringing signal.

15. A non-transitory computer-readable recording medium configured to store a program which causes a computer to execute a method for an apparatus which allows a connection of a telephone and connects to a telephone line, the method comprising:
controlling ringer impedance of the telephone line to be compliant with a standard;
detecting a ringing signal received from the telephone line;
determining whether the telephone captures the telephone line;
disabling the ringer impedance control until detecting the ringing signal; and
cancelling a disablement of the ringer impedance control,
wherein the disablement of the ringer impedance control is cancelled in a case where the ringing signal is detected, and
wherein the ringer impedance control is disabled in a case where it is determined that the telephone captures the telephone line after the ringing signal is detected and the disablement of the ringer impedance control is cancelled.

* * * * *